US012340921B2

(12) United States Patent
Wang

(10) Patent No.: US 12,340,921 B2
(45) Date of Patent: Jun. 24, 2025

(54) COAXIAL CABLE PROCESSING DEVICE AND METHOD

(71) Applicant: TYCO ELECTRONICS (SHANGHAI) CO., LTD., Shanghai (CN)

(72) Inventor: Zhen Wang, Shanghai (CN)

(73) Assignee: TYCO ELECTRONICS (SHANGHAI) CO., LTD., Shanghai (CN)

(*) Notice: Subject to any disclaimer, the term of this patent is extended or adjusted under 35 U.S.C. 154(b) by 640 days.

(21) Appl. No.: 17/481,802

(22) Filed: Sep. 22, 2021

(65) Prior Publication Data

US 2022/0102029 A1 Mar. 31, 2022

(30) Foreign Application Priority Data

Sep. 30, 2020 (CN) ........................ 202011062940.5

(51) Int. Cl.
*H01B 13/016* (2006.01)

(52) U.S. Cl.
CPC .................................. *H01B 13/016* (2013.01)

(58) Field of Classification Search
CPC ......... H01B 13/016; H01R 9/05; H01R 43/28
See application file for complete search history.

(56) References Cited

U.S. PATENT DOCUMENTS 3,621,560 A * 11/1971 LeBright ................ H01R 43/28 30/286
4,719,697 A * 1/1988 Schwartzman ........ H01R 43/05 81/9.51
4,785,517 A * 11/1988 Takano ................... B25B 27/10 29/235
4,802,512 A * 2/1989 Kodera ................ H02G 1/1256 81/9.51
6,363,604 B1 * 4/2002 Sakuma ............... H02G 1/1256 81/9.51
(Continued)

FOREIGN PATENT DOCUMENTS

CH 696509 A5 * 7/2007 ............. H01R 43/28
CN 105811221 B * 5/2018
EP 0989652 A1 * 3/2000 ............... H02G 1/12

*Primary Examiner* — Jeffrey T Carley
(74) *Attorney, Agent, or Firm* — Potomac Law Group, PLLC

(57) ABSTRACT

The present invention relates to a coaxial cable processing device and a method for processing a coaxial cable. The coaxial cable processing device has a first clamping member provided with a first clamping part; a second clamping member provided with a second clamping part which is opposite to the first clamping part; and a first driving device configured to drive the first clamping member and/or the second clamping member to make the first clamping part and the second clamping part move towards or away from each other in a straight line. When the first clamping member and the second clamping member move towards each other and clamp a shielding layer of a coaxial cable, the first clamping part and the second clamping part respectively surround a part of the coaxial cable in a circumferential direction and apply radial pressure on the shielding layer to flare it. The coaxial cable processing device of the present invention can replace manual operation and has high degree of automation.

14 Claims, 10 Drawing Sheets

(56) References Cited

U.S. PATENT DOCUMENTS

| | | | | |
|---|---|---|---|---|
| 6,659,140 | B2 * | 12/2003 | Yamakawa | H01R 43/28 140/71 R |
| 7,611,373 | B1 * | 11/2009 | LaSalvia | H01R 9/0524 439/394 |
| 8,424,196 | B2 * | 4/2013 | Mori | H02G 1/14 29/745 |
| 9,246,245 | B2 * | 1/2016 | Kawase | H01R 9/0518 |
| 9,906,005 | B2 * | 2/2018 | Baldauf | H02G 1/1297 |
| 10,347,400 | B2 * | 7/2019 | Lenz | H01B 13/0167 |
| 2009/0064754 | A1 * | 3/2009 | Chawgo | H02G 1/005 72/453.01 |
| 2020/0076173 | A1 * | 3/2020 | Houser | H01R 43/28 |
| 2020/0303910 | A1 * | 9/2020 | Houser | H02G 1/1265 |

* cited by examiner

COAXIAL CABLE PROCESSING DEVICE AND METHOD

CROSS-REFERENCE TO RELATED APPLICATION

This application claims the benefit of Chinese Patent Application No. 202011062940.5 filed on Sep. 30, 2020 in the State Intellectual Property Office of China, the whole disclosure of which is incorporated herein by reference.

FIELD OF THE INVENTION

The present invention relates to a coaxial cable processing device and a method for processing a coaxial cable.

DESCRIPTION OF RELATED ART

As shown in FIG. 1, the coaxial cable 200 includes an outer insulating layer 201, a shielding layer 202, an inner insulating layer 203 and a conductor 204 from the outside to the inside. When not processed, the end of coaxial cable 200 is flush. The end of the shielding layer 202 is flush with the end of the conductor 204. In some cases, it is necessary to connect the end of coaxial cable 200 to a connector or any other device. Before connecting, the end of the coaxial cable 200 needs to be processed to fit the connector or any other device. One of the processing operations is as shown in FIG. 2, the shielding layer 202 needs to be flared to a certain angle with respect to the inner insulating layer 203. The angle may be 60, 90 or 180 degrees depending on the actual use.

In the prior art, the shielding layer is generally flared by manual, which is not only labor-intensive, but also inefficient, and difficult to adapt to the needs of large-scale processing.

SUMMARY OF THE INVENTION

The present invention has been made to overcome or alleviate at least one aspect of the above-mentioned disadvantages.

According to an aspect of the present invention, a coaxial cable processing device is provided and comprises: a first clamping member provided with a first clamping part; a second clamping member provided with a second clamping part which is opposite to the first clamping part; and a first driving device configured to drive the first clamping member and/or the second clamping member to make the first clamping part and the second clamping part move towards or away from each other in a straight line. When the first clamping member and the second clamping member move towards each other and clamp a shielding layer of a coaxial cable, the first clamping part and the second clamping part respectively surround a part of the coaxial cable in a circumferential direction and apply radial pressure on the shielding layer to flare it.

According to an exemplary embodiment of the present invention, the first clamping part comprises a first contact section, and the second clamping part comprises a second contact section; the first contact section and the second contact section respectively surround half or more of the coaxial cable in the circumferential direction.

According to another exemplary embodiment of the present invention, the first clamping part further comprises a first inlet section which extends continuously from two ends of the first contact section respectively, an opening of the first inlet section is greater than or equal to an opening of the first contact section; and/or the second clamping part further comprises a second inlet section which extends continuously from two ends of the second contact section, the coaxial cable enters into the second contact section through the second inlet section; one end of the second inlet section is connected with the second contact section, and the other end is located at an end of the second clamping member; the opening of the second inlet section is greater than or equal to an opening of the second contact section.

According to another exemplary embodiment of the present invention, the first clamping part has a section of first contact surface, the first contact surface adapts to the shape of the shielding layer of the coaxial cable along the circumferential direction, and the first contact surface extends a selected width in an axial direction of the first clamping part; and/or the second clamping part has a section of second contact surface, the second contact surface adapts to the shape of the shielding layer of the coaxial cable along the circumferential direction, and the second contact surface extends a selected width in an axial direction of the second clamping part; the first clamping member has a section of first diffusion port, and the first diffusion port gradually increases along the axial direction of the first clamping part from the first contact surface; and/or the second clamping member has a section of second diffusion port, and the second diffusion port gradually increases along the axial direction of the second clamping part from the second contact surface.

According to another exemplary embodiment of the present invention, the first clamping member comprises a first body and a first wedge, the thickness of the first wedge is less than that of the first body, and the first clamping part is provided on the first wedge; the second clamping member comprises a second body and a second wedge, the thickness of the second wedge is less than that of the second body, and the second clamping part is provided on the second wedge.

According to another exemplary embodiment of the present invention, when the first clamping member and the second clamping member clamp the coaxial cable, the first wedge and the second wedge are staggered.

According to another exemplary embodiment of the present invention, the coaxial cable processing device further comprises a pushing member having a first axial hole, the pushing member is adapted to be moved along an axial direction of the coaxial cable to be inserted between the shielding layer and an inner insulating layer of the coaxial cable; when the pushing member moves along the coaxial cable, the pushing member pushes the shielding layer to increase an angle of the shielding layer with respect to the inner insulating layer.

According to another exemplary embodiment of the present invention, the pushing member has a first pushing pipe and a second pushing pipe, the first pushing pipe is provided in the second pushing pipe and is movable relative to the second pushing pipe; the first axial hole is formed in the first pushing pipe, the second pushing pipe is formed with a second axial hole; when the first pushing pipe moves relative to the second pushing pipe, the first pushing pipe extends out of the second pushing pipe or completely enters into the second axial hole.

According to another exemplary embodiment of the present invention, a reset device is provided in the second axial hole; when the first pushing pipe moves into the second axial hole, the reset device is compressed by the first pushing pipe to generate an elastic force for resetting the first pushing pipe.

According to another exemplary embodiment of the present invention, the second pushing pipe is formed with a sliding groove. A shaft pin is provided on the first pushing pipe. The shaft pin is placed in the sliding groove and is adapted to be slid along the sliding groove.

According to another exemplary embodiment of the present invention, when the pushing member is inserted between the shielding layer and the inner insulating layer of the coaxial cable, the first pushing pipe is capable of pushing the shielding layer against an outer insulating layer of the coaxial cable to flare the shielding layer open forming an angle of 90 degrees with respect to the inner insulating layer.

According to another exemplary embodiment of the present invention, the second pushing pipe is adapted to be sheathed outside the outer insulating layer of the coaxial cable, so that the shielding layer is adapted to be flared by any angle between 90 degrees and 180 degrees from its initial position.

According to another aspect of the present invention, there is provided a coaxial cable processing device comprising a pushing member formed with a first axial hole, the pushing member is adapted to be moved along an axial direction of a coaxial cable to be inserted between a shielding layer and an inner insulating layer of the coaxial cable; when the pushing member moves along the coaxial cable, the pushing member pushes the shielding layer to increase an angle of the shielding layer with respect to the inner insulating layer.

According to an exemplary embodiment of the present invention, the pushing member comprises a first pushing pipe and a second pushing pipe, the first axial hole is formed in the first pushing pipe, the second pushing pipe is formed with a second axial hole, the first pushing pipe is provided in the second axial hole and is movable relative to the second pushing pipe; when the first pushing pipe moves relative to the second pushing pipe, the first pushing pipe extends out of the second pushing pipe or completely enters into the second axial hole.

According to another exemplary embodiment of the present invention, the first pushing pipe is adapted to push the shielding layer against an outer insulating layer of the coaxial cable to flare the shielding layer open forming an angle of 90 degrees with respect to the inner insulating layer; the second pushing pipe is adapted to be sheathed outside the outer insulating layer of the coaxial cable, so that the shielding layer is adapted to be flared by any angle between 90 degrees and 180 degrees from its initial position.

According to another aspect of the present invention, there is provided a method for processing a coaxial cable, comprising steps of: providing a clamping member for clamping the coaxial cable, the clamping member is provided with a clamping part which surrounds the coaxial cable along a circumferential direction of the coaxial cable; placing the coaxial cable to be processed at a predetermined position, wherein one end of the coaxial cable is pretreated, an outer insulating layer is stripped to expose a shielding layer, an inner insulating layer, and an inner conductor in turn; fixing the coaxial cable; driving the clamping member to move linearly along a radial direction of the coaxial cable, so that the clamping part surrounds the coaxial cable along the circumferential direction of the coaxial cable and presses the shielding layer along the radial direction of the coaxial cable to flare the end of the shielding layer along the radial direction; and pushing the shielding layer along the axial direction of the coaxial cable to flare the shielding layer by a predetermined angle between 0 and 180 degrees with respect to the inner insulating layer.

According to the coaxial cable processing device and the method for processing the coaxial cable in the present invention, the first clamping member and the second clamping member jointly clamp the shielding layer of the coaxial cable, so that the shielding layer can be flared to a certain angle after being pressed, and the pushing member can smoothly pushes the shielding layer. The pushing member pushes the shielding layer along the axial direction, so that the shielding layer can be flared to the required angle. The first clamping part and the second clamping part respectively surround the coaxial cable in the circumferential direction. The first clamping member and the second clamping member only need to move in one direction and do not need to rotate to exert pressure on the shielding layer in the circumferential direction, which is convenient for operation. The first circular arc section and the second circular arc section can be closed to form a circular hole, which can adapt to the shape of coaxial cable and further ensure that the shielding layer is pressed along the circumferential direction and flared. The first elliptical arc section and the second elliptical arc section can be closed to form an elliptical hole, and can also adapt to the shape of the coaxial cable, so that the shielding layer is pressed along the circumferential direction and flared. The first clamping part is provided with a first inlet section, and the second clamping part is provided with a second inlet section, so as to ensure that the first clamping part of the first clamping member and the second clamping part of the second clamping member can clamp and hold the coaxial cable smoothly. The opening of the first inlet section is larger than the opening of the first contact section, and the opening of the second inlet section is larger than the opening of the second contact section, so that the first clamping part and the second clamping part can surround the coaxial cable more smoothly when the first clamping member and the second clamping member move towards the coaxial cable. The first contact surface and the second contact surface are planes extending along the axial direction, which can increase the contact area with the shielding layer and prevent the shielding layer from being cut. A first diffusion port or a second diffusion port is provided to make the shielding layer flare under pressure. The thickness of the first wedge is less than the thickness of the first body, and the thickness of the second wedge is less than the thickness of the second body, so that the total thickness of the first wedge and the second wedge will not increase and protrude outward when they are staggered. The first clamping member and the second clamping member are provided in linkage, which makes the operation more convenient and the movement rhythm more consistent. The pushing part can make the shielding layer flare at the required angle. By providing the first and second pushing pipes, the flaring angle of the shielding layer can be more selective. The first pushing pipe can make the shielding layer flare to 90 degrees to make the shielding layer perpendicular to the insulating layer. The second pushing pipe can make the shielding layer flare to 180 degrees at most, so that the shielding layer is folded and wrapped on the surface of the outer insulating layer. By providing the reset part, the first pipe can be reset automatically. The coaxial cable processing device of the present invention can replace manual operation and has high degree of automation.

BRIEF DESCRIPTION OF THE DRAWINGS

The above and other features of the present invention will become more apparent by describing in detail exemplary embodiments thereof with reference to the accompanying drawings, in which.

DETAILED DESCRIPTION OF PREFERRED EMBODIMENTS OF THE INVENTION

Figure 1:
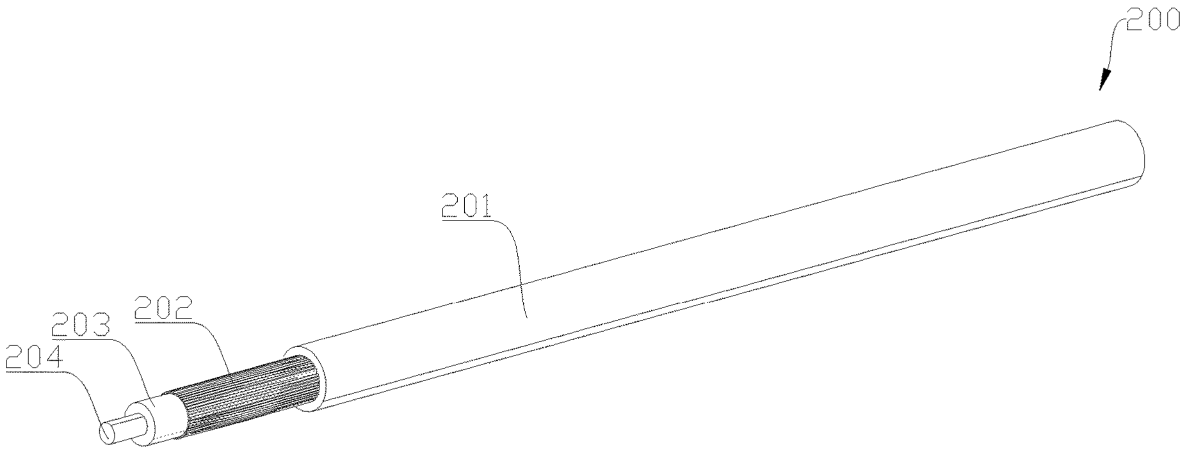
FIG. 1 is an illustrative structure view of a coaxial cable according to an exemplary embodiment of the present invention.
Figure 2:
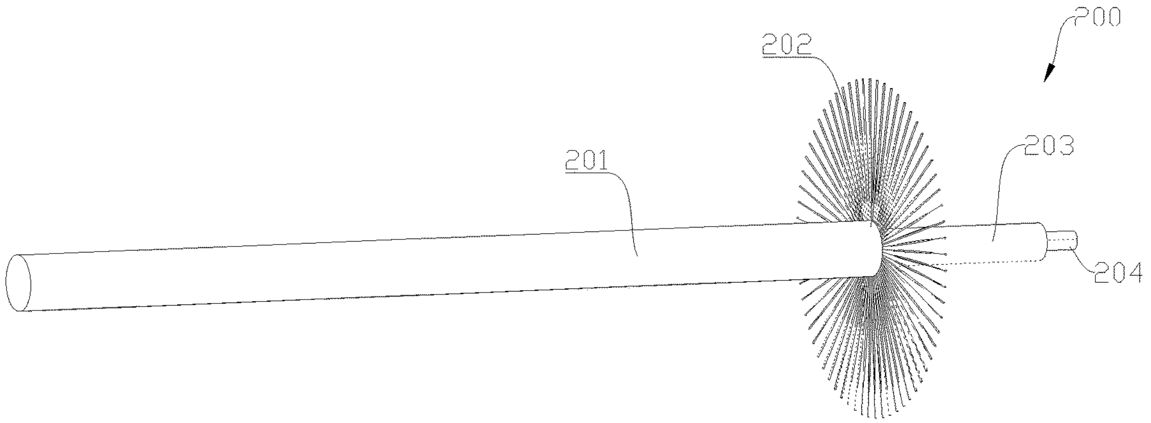
FIG. 2 is an illustrative view of a coaxial cable after its end is processed.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to a general concept of the present invention, there is provided a coaxial cable processing device, comprising: a first clamping member provided with a first clamping part; a second clamping member provided with a second clamping part which is opposite to the first clamping part; and a first driving device configured to drive the first clamping member and/or the second clamping member to make the first clamping part and the second clamping part move towards or away from each other in a straight line. When the first clamping member and the second clamping member move towards each other and clamp a shielding layer of a coaxial cable, the first clamping part and the second clamping part respectively surround a part of the coaxial cable in a circumferential direction and apply radial pressure on the shielding layer to flare it.

According to another general concept of the present invention, there is provided a coaxial cable processing device comprising a pushing member formed with a first axial hole, the pushing member is adapted to be moved along an axial direction of a coaxial cable to be inserted between a shielding layer and an inner insulating layer of the coaxial cable; when the pushing member moves along the coaxial cable, the pushing member pushes the shielding layer to increase an angle of the shielding layer with respect to the inner insulating layer.

According to another general concept of the present invention, there is provided a method for processing a coaxial cable, comprising steps of: providing a clamping member for clamping the coaxial cable, the clamping member is provided with a clamping part which surrounds the coaxial cable along a circumferential direction of the coaxial cable; placing the coaxial cable to be processed at a predetermined position, wherein one end of the coaxial cable is pretreated, an outer insulating layer is stripped to expose a shielding layer, an inner insulating layer, and an inner conductor in turn; fixing the coaxial cable; driving the clamping member to move linearly along a radial direction of the coaxial cable, so that the clamping part surrounds the coaxial cable along the circumferential direction of the coaxial cable and presses the shielding layer along the radial direction of the coaxial cable to flare the end of the shielding layer along the radial direction; and pushing the shielding layer along the axial direction of the coaxial cable to flare the shielding layer by a predetermined angle between 0 and 180 degrees with respect to the inner insulating layer.

As shown in FIG. 3 to FIG. 9, a coaxial cable processing device 100 includes a first clamping member 110 and a second clamping member 130. The first clamping member 110 includes a first body 111 and a first wedge 112. The first body 111 and the first wedge 112 are integrally formed. The thickness of the first wedge 112 is less than that of the first body 111. A first clamping part 113 is arranged at the side end of the first wedge 112. The first clamping part 113 includes a first contact section 114 and a first inlet section 118. The first contact section 114 is used for contacting with the coaxial cable 200 and encircling a part of the coaxial cable 200 in a circumferential direction. The shape of the first contact section 114 is adapted to the shape of the coaxial cable 200 and is preferably arc-shaped or elliptical arc-shaped. In the example shown in the figure, the projection view of the first contact segment 114 is an arc. The first contact section 114 of the first clamping part 113 has a section of first contact surface 115, the first contact surface 115 adapts to the shape of the coaxial cable 200 along the circumferential direction, the first contact surface 115 extends a selected width along the axial direction of the first clamping part 113, and extending the selected width can increase the contact area between the first contact surface 115 and the coaxial cable 200, prevent the first contact surface 115 from being too sharp, and protect the coaxial cable 200 from being cut. The specific width value can be determined according to the actual use effect. According to a preferred embodiment of the invention, the first contact section 115 circumferentially surrounds half or more of the coaxial cable 200. The first wedge 112 of the first clamping part 110 is provided with a section of first diffusion port 116, which gradually increases along the axial direction of the first clamping part 113 from the first contact surface 115 and extends to the end face 117 of the first clamping part. In other words, the first diffusion port 116 gradually shrinks along the axial direction of the first clamping part 113 from the end face 117 of the first clamping part until the first contact surface 115.

The first clamping part 113 also includes a first inlet section 118 extending from the opening of the first contact section 114 and provided with an opening. The opening of the first inlet section 118 is larger than that of the first contact section 114. When the coaxial cable 200 moves relative to the first clamping member 110, the coaxial cable 200 enters from the opening of the first inlet section 118, passes through the first inlet section 118, and enters into the first contact section 114 from the opening of the first contact section 114.

Figure 10:
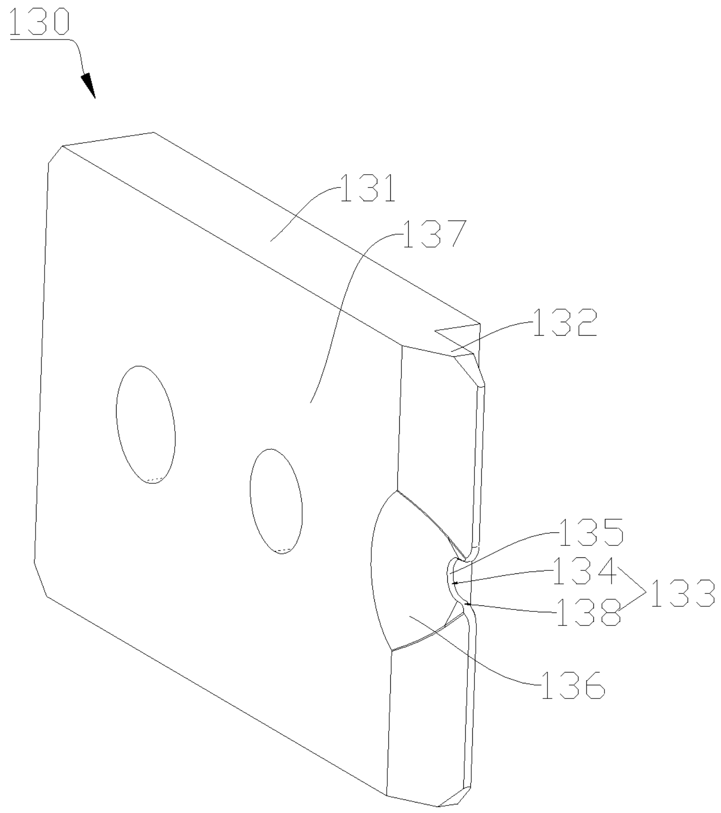
FIG. 10 is an illustrative structural view of a second clamping member according to an exemplary embodiment of the present invention.
Figure 11:
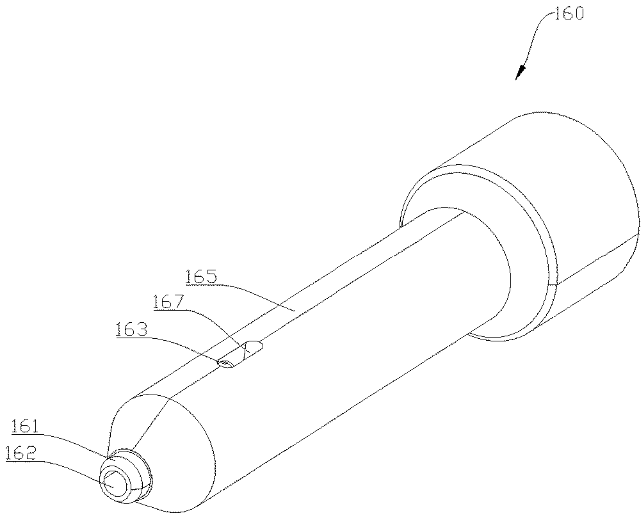
FIG. 11 is an illustrative structural view of a pushing member according to an exemplary embodiment of the present invention.
Figure 12:
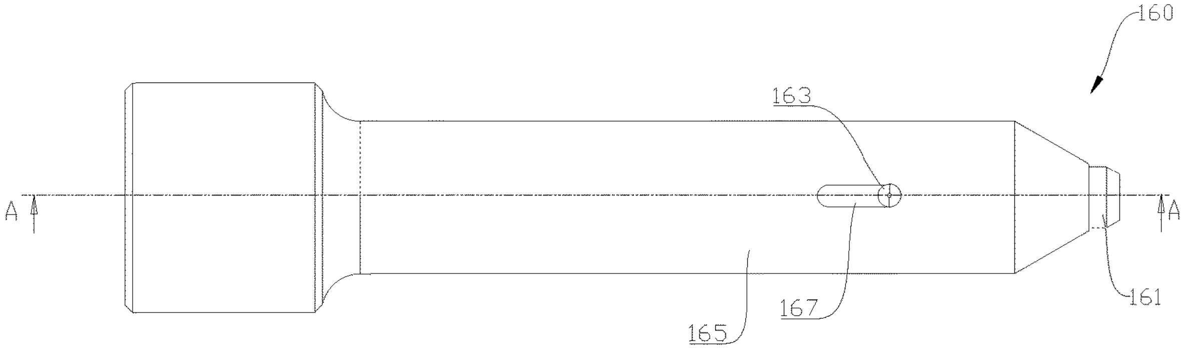
FIG. 12 is a top view of a pushing member according to an exemplary embodiment of the present invention.
Figure 13:
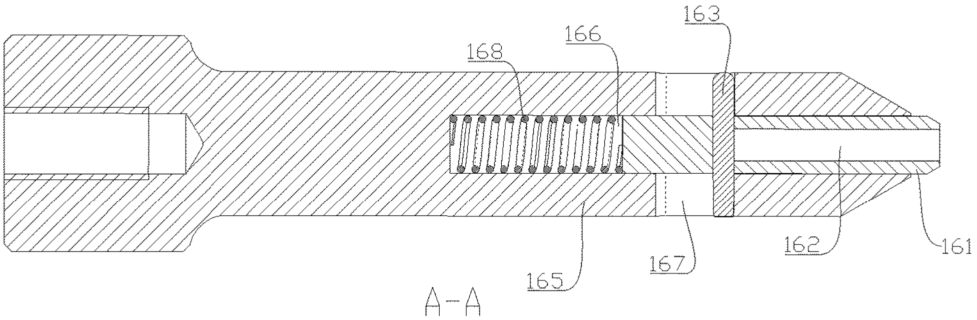
FIG. 13 is an A-A sectional view of the pushing member shown in FIG. 12.

As shown in FIG. 10, the second clamping member 130 has the same structure as the first clamping member 110. The second clamping member 130 includes a second body 131 and a second wedge 132. The second body 131 and the second wedge 132 are integrally formed. The thickness of the second wedge 132 is less than that of the second body 131. The side end of the second wedge 132 is provided with a second clamping part 133. The second clamping part 133 includes a second contact section 134 and a second inlet section 138. The second contact section 134 is used for contacting with the coaxial cable 200 and encircling a part of the coaxial cable 200 in a circumferential direction. The shape of the second contact section 134 is adapted to the shape of the coaxial cable 200, and is preferably arc-shaped or elliptical arc-shaped. In the example shown in the figure, the projection view of the second contact section 134 is an arc. The second contact section 134 of the second clamping part 133 has a section of second contact surface 135, the second contact surface 135 is adapted to the shape of the coaxial cable 200 along the circumferential direction, the second contact surface 135 extends a selected width along the axial direction of the second clamping part 133, and extending the selected width can increase the contact area between the second contact surface 135 and the coaxial cable 200, prevent the second contact surface 135 from being too sharp, and protect the coaxial cable 200 from being cut. The specific width value can be determined according to the actual use effect. According to the preferred embodiment of the invention, the second contact section 135 surrounds half or more of the coaxial cable 200 in the circumferential direction. The second wedge 132 of the second clamping part 130 is provided with a section of second diffusion port 136, which gradually increases along the axial direction of the second clamping part 133 from the second contact surface 135 and extends to the end face 137 of the second clamping part. In other words, the second diffusion port 136 gradually shrinks along the axial direction of the second clamping part 133 from the end face 137 of the second clamping member until the second contact surface 135.

The second clamping part 133 also includes a second inlet section 138. The second inlet section 138 extends from the opening of the second contact section 134 and is provided with an opening. The opening of the second inlet section 138 is larger than that of the second contact section 134. When the coaxial cable 200 moves relative to the second clamping member 130, the coaxial cable 200 enters from the opening of the second inlet section 138, passes through the second inlet section 138, and enters into the second contact section 134 from the opening of the second contact section 134.

Figure 3:
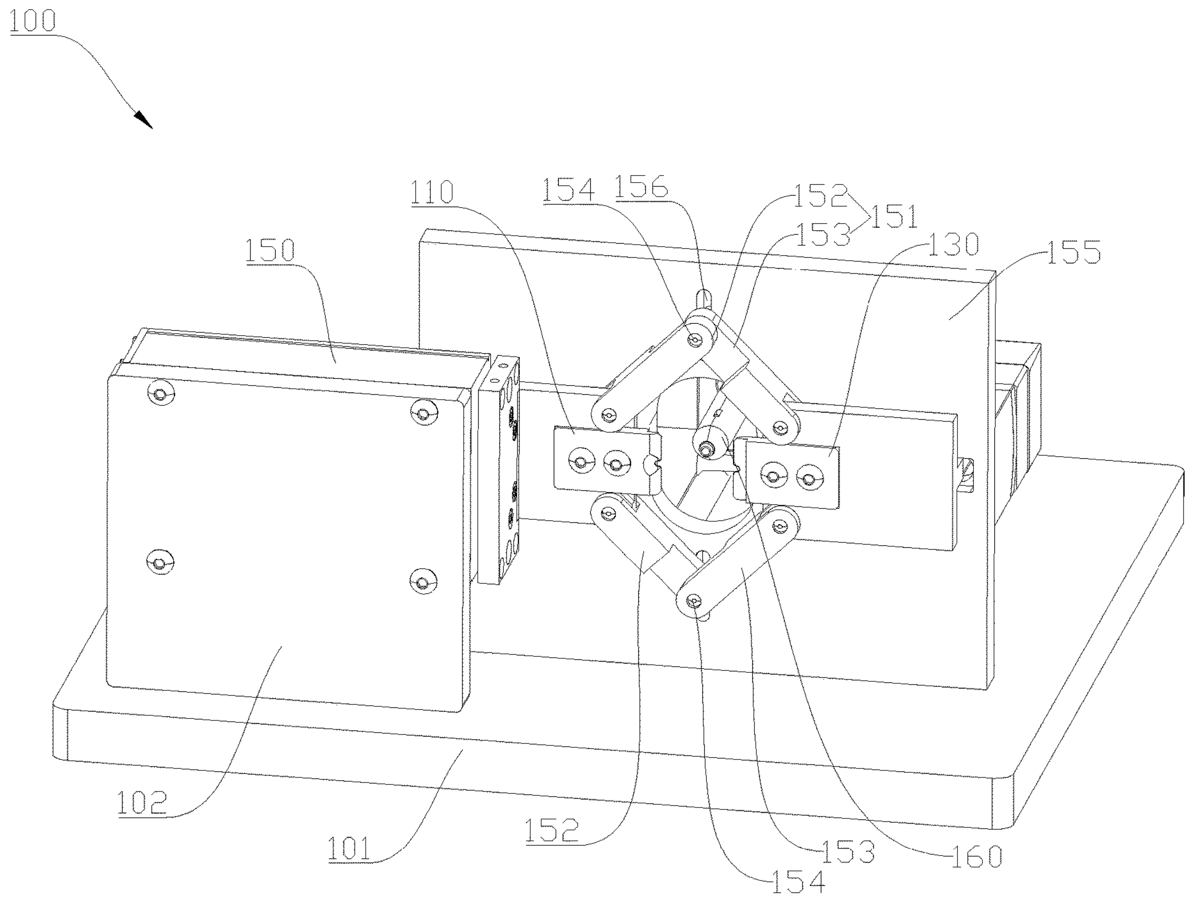
FIG. 3 is an illustrative structure view of a coaxial cable processing device according to an exemplary embodiment of the present invention.
Figure 4:
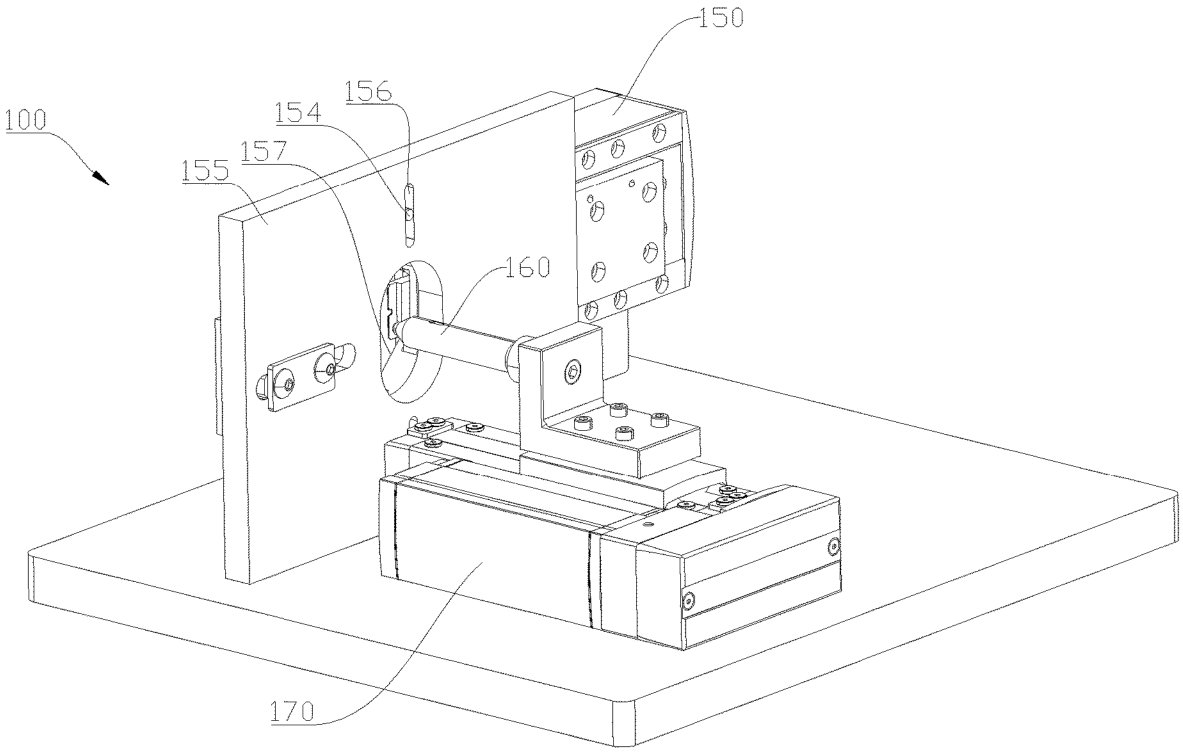
FIG. 4 is an illustrative structure view of a coaxial cable processing device according to an exemplary embodiment of the present invention when viewed from another angle.
Figure 5:
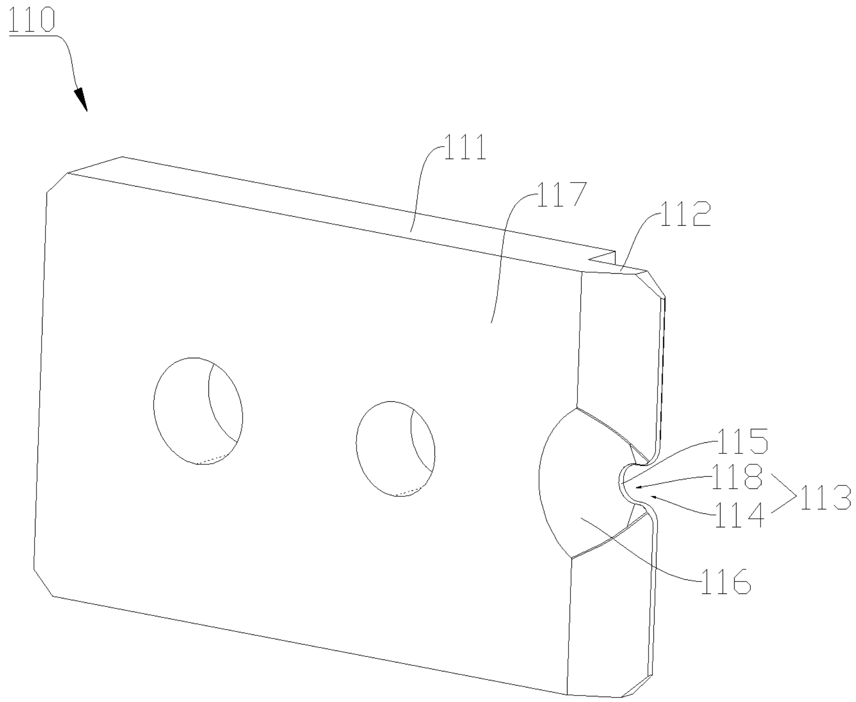
FIG. 5 is an illustrative structure view of a first clamping member according to an exemplary embodiment of the present invention.
Figure 6:
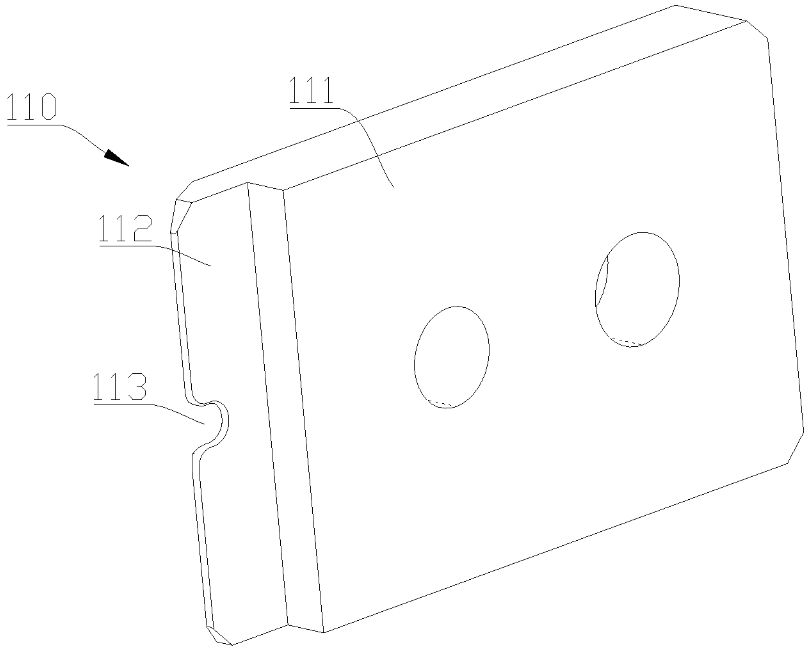
FIG. 6 is an illustrative structure view of the first clamping member according to an exemplary embodiment of the present invention when viewed from another angle.

As shown in FIG. 3 and FIG. 4, the coaxial cable processing device 100 in the present invention also includes a first driving device 150. The first driving device 150 is used to drive the first clamping member 110 and/or the second clamping member 130 to move towards or away from each other. The number of the first driving device 150 may be one or two. When the number of the first driving device 150 is one, the first clamping member 110 and the second clamping member 130 are provided in linkage, that is, the first driving device 150 can drive the first clamping member 110 and the second clamping member 130 to move simultaneously. According to the technical scheme of the invention, the first driving device 150 is a linear motor. The first driving device 150 is connected with the first body 112 of the first clamping member 110. The first clamping member 110 and the second clamping member 130 are connected by two sets of connecting rods 151. Each set of connecting rods 151 includes a first connecting rod 152 and a second connecting rod 153. One end of the first connecting rod 152 is rotatably connected with the first clamping member 110, and the other end is connected with a pin shaft 154. The pin shaft 154 is partially arranged in a groove 156 on a mounting seat 155 and can slide up and down along the groove 156. One end of the second connecting rod 153 is rotatably connected with the pin shaft 154, and the other end is rotatably connected with the second clamping member 130. Through the two sets of connecting rods 151, the first clamping member 110 and the second clamping member 130 can be linked, and the first clamping member 110 and the second clamping member 130 can synchronously move towards or away from each other. In the example shown in the figure, when the first driving device 150 drives the first clamping member 110 laterally to move towards the second clamping member 130, the two first connecting rods 152 are driven by the first clamping member 110 to push the two pin shafts 154 to slide up and down away from each other respectively. When the two pin shafts 154 slide up and down respectively, the second clamping member 130 is pulled to the first clamping member 110 through the second connecting rod 153, so that the first clamping member 110 and the second clamping member 130 move towards each other, that is, they are close to each other. If the first clamping member 110 and the second clamping member 130 need to move away from each other, the first driving device 150 drives the first clamping member 110 to move away from the second clamping member 130, and the two first connecting rods 152 are driven by the first clamping member 110, and the two pin shafts 154 move downward and upward respectively to approach each other, The two pin shafts 154 push the second clamping member 130 away from the first clamping member 110 through the two second connecting rods 153.

Figure 15:
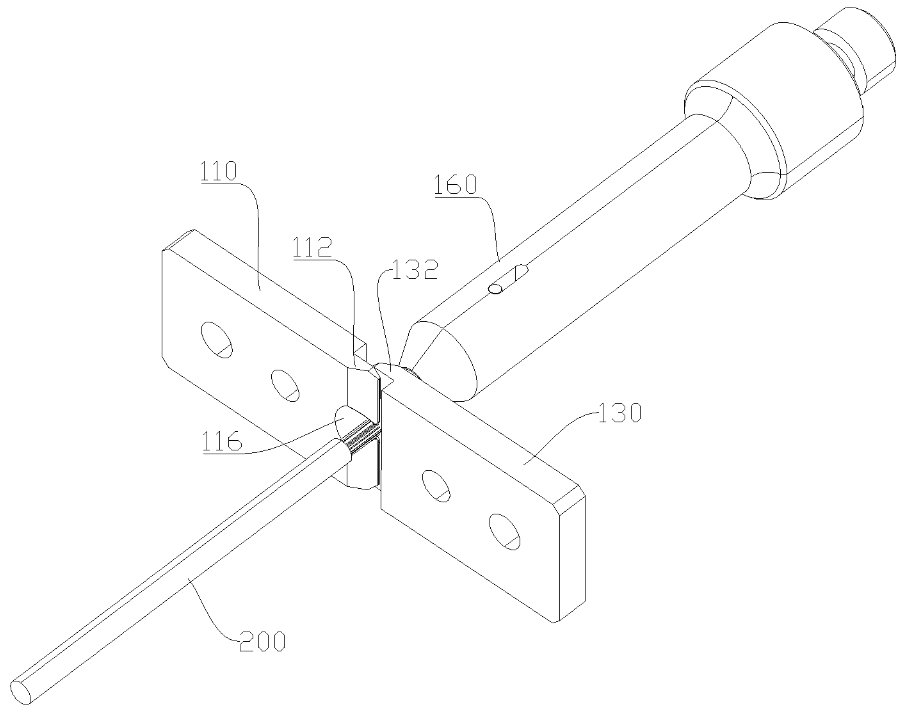
FIG. 15 shows a state in which the first clamping member and the second clamping member clamp the coaxial cable in FIG. 14.

As shown in FIG. 15, the first clamping member 110 and the second clamping member 130 are close to each other until they are closed, and the first contact section 114 and the second contact section 134 respectively surround half or more of the coaxial cable 200 in the circumferential direction. The first contact section 114 and the second contact section 134 are closed into a circle and can surround the coaxial cable 200 by 360 degrees. The diameter of the circle formed by the first contact section 114 and the second contact section 134 is slightly smaller than the diameter of the shielding layer 202 of the coaxial cable 200. When the first contact section 114 and the second contact section 134 are closed, pressure can be applied to the shielding layer 202. When the shielding layer 202 is pressed by force, the end of the shielding layer flares outwards in an umbrella shape.

As shown in FIG. 3, FIG. 4, and FIG. 11 to FIG. 13, the coaxial cable processing device in the present invention also includes a pushing member 160, which is used for pushing the shielding layer 202 to make the shielding layer 202 flare at a predetermined angle. In the example shown in the figure, the pushing member 160 includes a first pushing pipe 161 and a second pushing pipe 165. The first pushing pipe 161 is provided with a first axial hole 162. The first axial hole 162 is used to accommodate the partial inner insulating layer 203 of the coaxial cable 200. The outer wall of the first pushing pipe 161 is provided with two shaft pins 163. The shaft pin 163 protrudes from the first pushing tube 161. The two shaft pins 163 are symmetrically arranged. The second pushing pipe 165 is provided with a second axial hole 166. The second pushing pipe 165 is also provided with two sliding grooves 167 adapted to the shaft pin 163. The first pushing pipe 161 is partially inserted into the second axial hole 166, partially protruded out of the second axial hole 166, and can slide in the second axial hole 166. When the first pushing pipe 161 slides along the second axial hole 166, it can all enter into the second axial hole 166. Each shaft pin 163 is located in one of the sliding grooves 167 and can slide in the sliding groove 167. The sliding groove 167 is matched with the shaft pin 163, which can not only guide the first pushing pipe 161 when it slides, but also limit the sliding distance of the first pushing pipe 161.

A compression spring 168 is provided in the second axial hole 166. One end of the compression spring 168 butts against the second pushing pipe 165, and the other end butts against the first pushing pipe 161. When the first pushing pipe 161 slides into the second axial hole 166, the compression spring 168 is compressed and deformed by the first pushing pipe 161 to generate an elastic force. The elastic force of the compression spring 168 can reset the first pushing pipe 161. The compression spring 168 may help the first pushing tube 161 to remain in the initial position. When the external force on the first pushing pipe 161 is greater than the retaining force of the compression spring 168, the first pushing pipe 161 compresses the compression spring 168 and retracts into the second axial hole 166.

The coaxial cable processing device in the present invention also includes a second driving device 170 and a fixing device (not shown), and the second driving device 170 is used to drive the pushing member 160 to move towards the coaxial cable 200. The second driving device 170 is a cylinder or a motor. The fixing device is used for fixing the main body of the coaxial cable 200 to facilitate the processing operation of other parts. The mounting seat 155 is provided with a through hole 157. The pushing member 160 passes through the through hole 157. The coaxial cable 200 and the second driving device 170 are respectively located on both sides of the mounting base 155. When the pushing member 160 is driven by the second driving device 170 to move, it passes through the through hole 157 and butts the coaxial cable 200.

Figure 14:
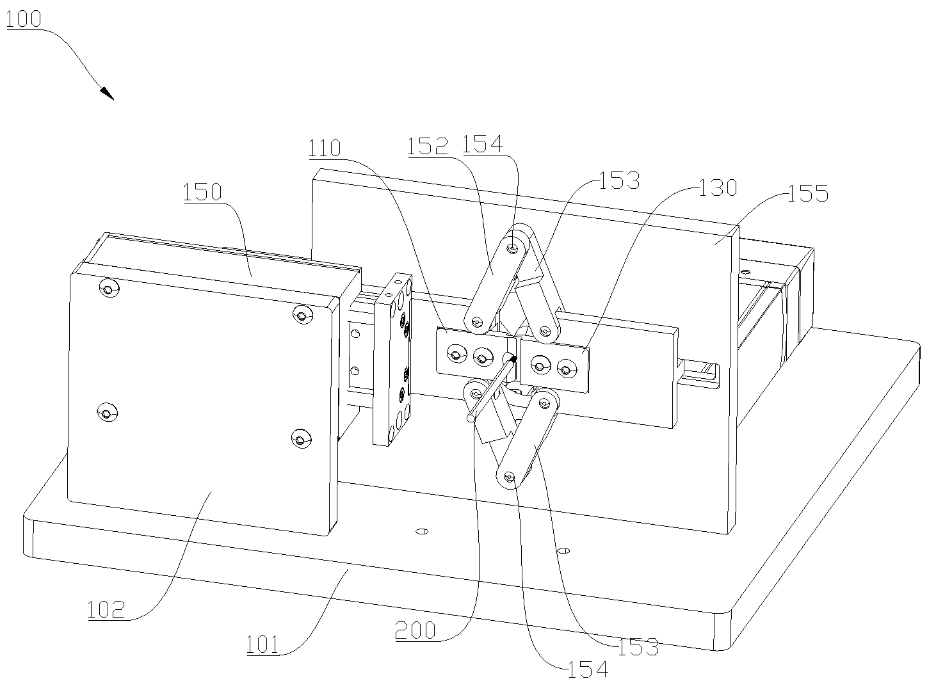
FIG. 14 shows a state when the first clamping member and the second clamping member of the coaxial cable processing device of the present invention clamp the coaxial cable and the pushing member begin to push the coaxial cable.
Figure 16:
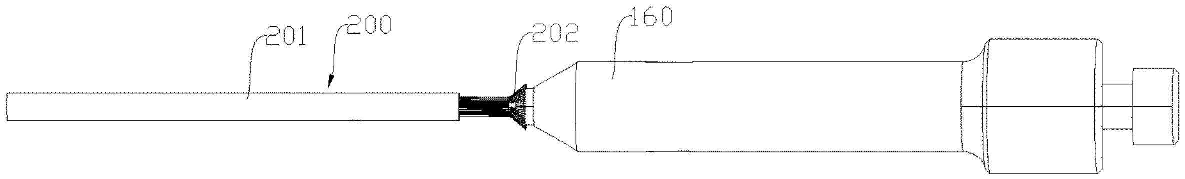
FIG. 16 shows the pushing member and the coaxial cable in FIG. 14.
Figure 17:
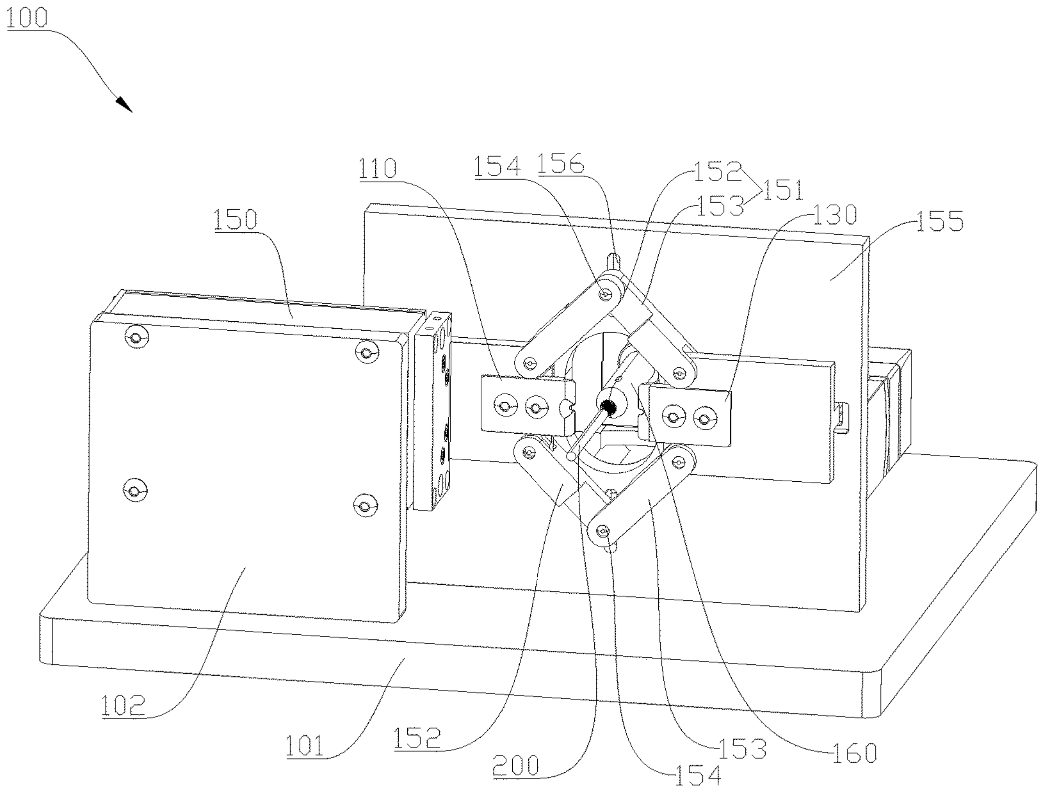
FIG. 17 shows a state when the pushing member pushes the shielding layer to the required angle.
Figure 18:
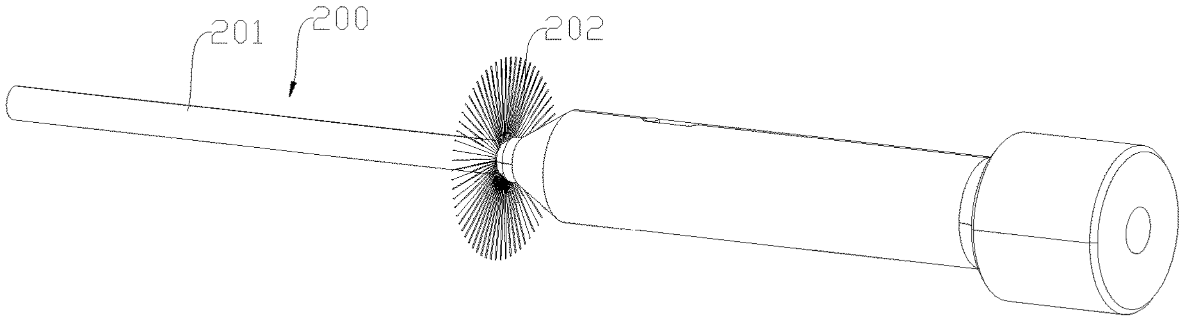
FIG. 18 shows the pushing member and the coaxial cable in FIG. 17.
Figure 19:
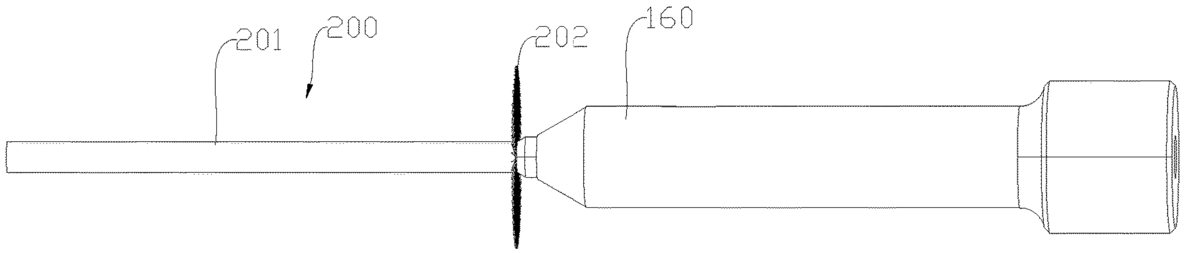
FIG. 19 is a front view of the pushing member and the coaxial cable shown in FIG. 18.
Figure 20:
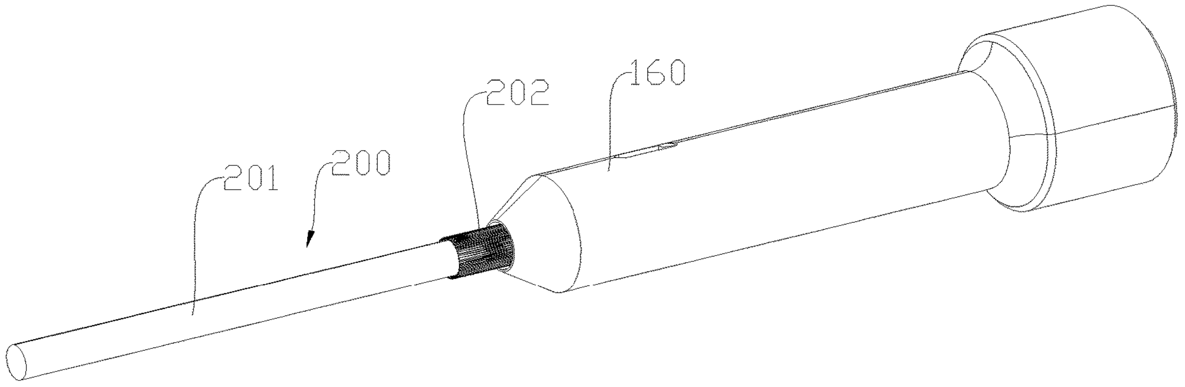
FIG. 20 shows a state when the shielding layer is compressed by the pushing member to 180 degrees with respect to the inner insulating layer.

When the coaxial cable processing device of the present invention is used, as shown in FIG. 14 to FIG. 16, the fixing device 180 fixes the coaxial cable 200. The first driving device 150 drives the first clamping member 110 and the second clamping member 130 to move to the position of clamping the shielding layer 202. The first clamping member 110 and the second clamping member 130 exert pressure on the shielding layer 202 to flare the shielding layer 202 at a certain angle so that the first pushing pipe 161 can be inserted between the shielding layer 202 and the inner insulating layer 203. As shown in FIGS. 17 to 19, the second driving device 170 drives the second pushing pipe 165 and the first pushing pipe 161 to move along the axial direction of the coaxial cable 200 towards the coaxial cable 200 until the inner insulating layer 203 is inserted into the first axial hole 162, and the first pushing pipe 161 is sheathed on the inner insulating layer 203 and inserted between the shielding layer 202 and the inner insulating layer 203. The first pushing pipe 161 pushes the shielding layer 202 to a required angle. When the first pushing pipe 161 butts against the outer insulating layer 201, the shielding layer 202 is pushed to an angle perpendicular to the inner insulating layer 203. As shown in FIG. 20, when the first pushing pipe 161 pushes against the outer insulating layer 201, the first pushing pipe 210 cannot continue to move forward. If the second driving device 170 continues to drive the second pushing pipe 165 to move, the first pushing pipe 161 pushes the compression spring 168 to compress it, and the first pushing pipe 161 retracts into the second axial hole 166. The second pushing tube 166 pushes the shielding layer 202 to the surface of the outer insulating layer 201.

The coaxial cable processing device can form coaxial cable processing equipment together with other processing parts to perform more processing operations on coaxial cables.

As mentioned above, the present invention provides a method for processing coaxial cable, comprising steps of:

providing a clamping member 110, 130 for clamping the coaxial cable 200, wherein the clamping member 110, 130 is provided with a clamping part 113, 133 which surrounds the coaxial cable 200 along a circumferential direction of the coaxial cable 200;

placing the coaxial cable 200 to be processed at a predetermined position, wherein one end of the coaxial cable 200 is pretreated, an outer insulating layer 201 is stripped to expose a shielding layer 202, an inner insulating layer 203, and an inner conductor 204 in turn;

fixing the coaxial cable 200;

driving the clamping member 110, 130 to move linearly along a radial direction of the coaxial cable 200, so that the clamping part 113, 133 surrounds the coaxial cable 200 along the circumferential direction of the coaxial cable 200 and presses the shielding layer 202 along the radial direction of the coaxial cable 200 to flare the end of the shielding layer 202 along the radial direction; and pushing the shielding layer 202 along the axial direction of the coaxial cable 200 to flare the shielding layer 202 by a predetermined angle between 0 and 180 degrees with respect to the inner insulating layer 203.

Figure 7:
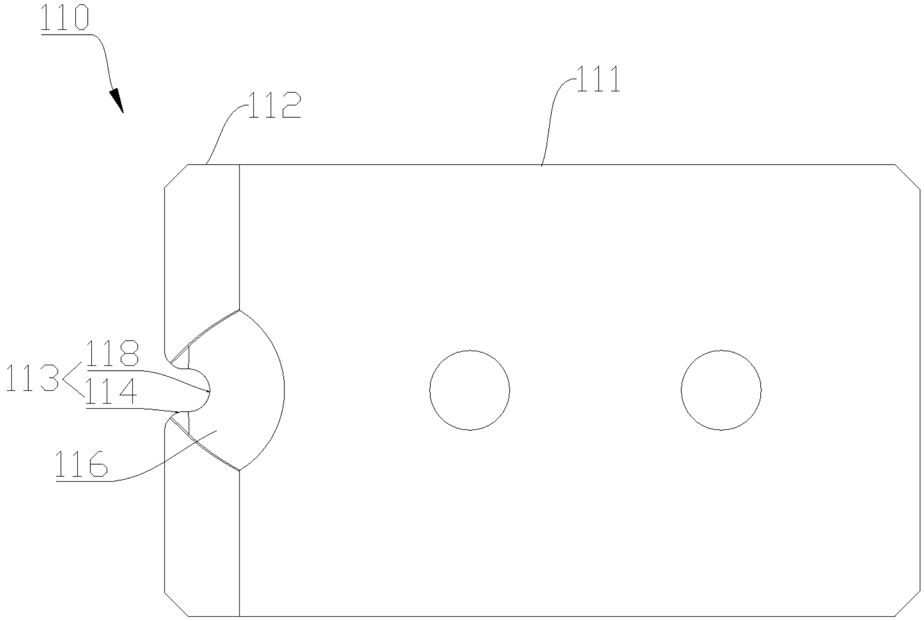
FIG. 7 is a front view of the first clamping member according to an exemplary embodiment of the present invention.
Figure 8:
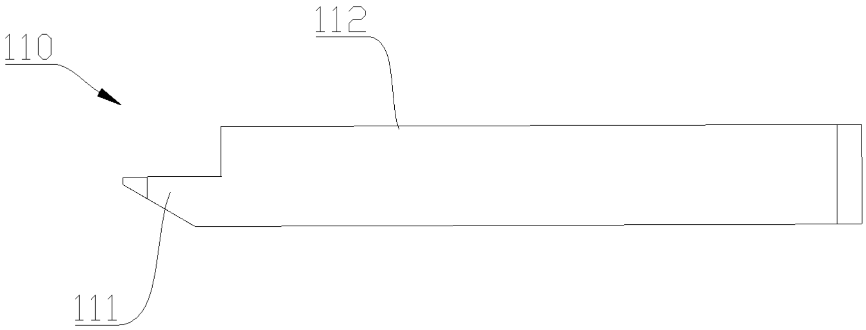
FIG. 8 is a top view of the first clamping member in FIG. 7.
Figure 9:
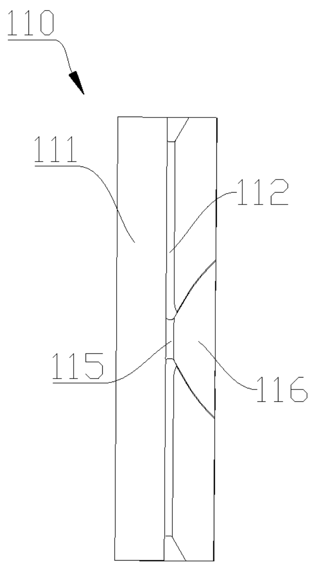
FIG. 9 is a left view of the first clamping member in FIG. 7.

The axial direction of the present invention is perpendicular to the paper surface with reference to FIG. 7; The radial direction is the left and right direction and the up and down direction with reference to FIG. 7. The thickness is perpendicular to the paper direction with reference to FIG. 7 and up and down direction with reference to FIG. 8.

According to the coaxial cable processing device and the method for processing the coaxial cable in the present invention, the first clamping member and the second clamping member jointly clamp the shielding layer of the coaxial cable, so that the shielding layer can be flared to a certain angle after being pressed, and the pushing member can smoothly push the shielding layer. The pushing member pushes the shielding layer along the axial direction, so that the shielding layer can be flared to the required angle. The first clamping part and the second clamping part respectively surround the coaxial cable in the circumferential direction. The first clamping member and the second clamping member only need to move in one direction and do not need to rotate to exert pressure on the shielding layer in the circumferential direction, which is convenient for operation. The first circular arc section and the second circular arc section can be closed to form a circular hole, which can adapt to the shape of coaxial cable and further ensure that the shielding layer is pressed along the circumferential direction and flared. The first elliptical arc section and the second elliptical arc section can be closed to form an elliptical hole, and can also adapt to the shape of the coaxial cable, so that the shielding layer is pressed along the circumferential direction and flared. The first clamping part is provided with a first inlet section, and the second clamping part is provided with a second inlet section, so as to ensure that the first clamping part of the first clamping member and the second clamping part of the second clamping member can clamp and hold the coaxial cable smoothly. The opening of the first inlet section is larger than the opening of the first contact section, and the opening of the second inlet section is larger than the opening of the second contact section, so that the first clamping part and the second clamping part can surround the coaxial cable more smoothly when the first clamping member and the second clamping member move towards the coaxial cable. The first contact surface and the second contact surface are planes extending along the axial direction, which can increase the contact area with the shielding layer and prevent the shielding layer from being cut. A first diffusion port or a second diffusion port is provided to make the shielding layer flare under pressure. The thickness of the first wedge is less than the thickness of the first body, and the thickness of the second wedge is less than the thickness of the second body, so that the total thickness of the first wedge and the second wedge will not increase and protrude outward when they are staggered. The first clamping member and the second clamping member are provided in linkage, which makes the operation more convenient and the movement rhythm more consistent. The pushing part can make the shielding layer flare at the required angle. By providing the first and second pushing pipes, the flaring angle of the shielding layer can be more selective. The first pushing pipe can make the shielding layer flare to 90 degrees to make the shielding layer perpendicular to the insulating layer. The second pushing pipe can make the shielding layer flare to 180 degrees at most, so that the shielding layer is folded and wrapped on the surface of the outer insulating layer. By providing the reset part, the first pipe can be reset automatically. The coaxial cable processing device of the present invention can replace manual operation and has high degree of automation.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word “a” or “an” should be understood as not excluding plural of said elements or steps, unless such exclusion is explicitly stated. Furthermore, references to “one embodiment” of the present invention are not intended to be interpreted as excluding the existence of additional embodiments that also incorporate the recited features. Moreover, unless explicitly stated to the contrary, embodiments “comprising” or “having” an element or a plurality of elements having a particular property may include additional such elements not having that property.

What is claimed is:

1. A coaxial cable processing device, comprising:

a first clamping member provided with a first body and a first wedge, a first clamping part is arranged at a side end of the first wedge;

a second clamping member provided with a second body and a second wedge, a second clamping part is arranged at a side end of the second wedge, the second clamping part opposite to the first clamping part;

a thickness of the first wedge as measured perpendicular to an axial direction of the first body is less than the thickness as measured perpendicular to the axial direction of the first body of the first body, a thickness as measured perpendicular to an axial direction of the second body of the second wedge as measured perpendicular to the axial direction of the second body is less than the thickness of the second body, wherein the total thickness of the first wedge and the second wedge is less than or equal to the thickness of the first body or the second body; and a first driving device configured to drive at least one of the first clamping member and the second clamping member to make the first clamping part move-relative to the second clamping part move in a straight line, wherein as the first clamping member is moved relative to the second clamping member the first clamping member and the second clamping member engage each other and cooperate to clamp a shielding layer of a coaxial cable, the total thickness of the first wedge and the second wedge does not extend beyond the thickness of the first body or the thickness of the second body as the first clamping part and the second clamping part respectively surround a part of the coaxial cable in a circumferential direction and apply radial pressure on the shielding layer to flare it.

2. The coaxial cable processing device according to claim 1, wherein the first clamping part comprises a first contact section, and the second clamping part comprises a second contact section;

wherein with the first clamping member and the second clamping member engaged, the first contact section and the second contact section the coaxial cable in the circumferential direction.

3. The coaxial cable processing device according to claim 2, wherein the first clamping part further comprises a first inlet section which extends the first contact section respectively, an opening of the first inlet section is greater than or equal to an opening of the first contact section; and wherein the second clamping part further comprises a second inlet section which extends from the second contact section, the coaxial cable enters into the second contact section through the second inlet section; one end of the second inlet section is connected with the second contact section, and the other end is located at an end of the second clamping member; an opening of the second inlet section is greater than or equal to an opening of the second contact section.

4. The coaxial cable processing device according to claim 1, wherein the first clamping part has a first contact surface, the first contact surface engages the shielding layer of the coaxial cable along the circumferential direction, and the first contact surface extends a selected width in an axial direction of the first clamping part;

wherein the second clamping part has a second contact surface, the second contact surface engages the shielding layer of the coaxial cable along the circumferential direction, and the second contact surface extends a selected width in an axial direction of the second clamping part;

wherein the first clamping member has a first diffusion port, a thickness of the first diffusion port which is perpendicular to axial direction of the first body gradually increases along the axial direction of the first clamping part from the first contact surface; and wherein the second clamping member has a second diffusion port, a thickness of the second diffusion port which is perpendicular to axial direction of the second body gradually increases along the axial direction of the second clamping part from the second contact surface.

5. The coaxial cable processing device according to claim 1, wherein the first clamping part is provided on the first wedge;

wherein the second clamping part is provided on the second wedge.

6. The coaxial cable processing device according to claim 1, wherein the first wedge and the second wedge are staggered.

7. The coaxial cable processing device according to claim 1, further comprising:

a pushing member having a first axial hole, wherein the pushing member is adapted to be moved along an axial direction of the coaxial cable to be inserted between the shielding layer and an inner insulating layer of the coaxial cable;

wherein the pushing member pushes the shielding layer to increase an angle of the shielding layer with respect to the inner insulating layer.

8. The coaxial cable processing device according to claim 7, wherein the pushing member comprises a first pushing pipe and a second pushing pipe, the first pushing pipe is provided in the second pushing pipe and is movable relative to the second pushing pipe;

wherein the first axial hole is formed in the first pushing pipe, the second pushing pipe is formed with a second axial hole;

wherein the first pushing pipe extends out of the second pushing pipe or completely enters into the second axial hole.

9. The coaxial cable processing device according to claim 8, wherein a reset device is provided in the second axial hole;

wherein the reset device applies an elastic force to the first pushing pipe.

10. The coaxial cable processing device according to claim 8, wherein the second pushing pipe is formed with a sliding groove, and a shaft pin is provided on the first pushing pipe; the shaft pin is placed in the sliding groove and is adapted to be slid along the sliding groove.

11. The coaxial cable processing device according to claim 8, wherein, as the pushing member is inserted between the shielding layer and the inner insulating layer of the coaxial cable, the first pushing pipe pushes the shielding layer against an outer insulating layer of the coaxial cable to flare the shielding layer open forming an angle of 90 degrees with respect to the inner insulating layer.

12. The coaxial cable processing device according to claim 11, wherein the second pushing pipe is sheathed outside the outer insulating layer of the coaxial cable, so that the shielding layer is adapted to be flared by any angle between 90 degrees and 180 degrees from its initial position.

13. A coaxial cable processing device, comprising:

a pushing member comprising a first pushing pipe and a second pushing pipe, a first axial hole is formed in the first pushing pipe, the second pushing pipe is formed with a second axial hole, the first pushing pipe is provided in the second axial hole and is movable relative to the second pushing pipe, an outer wall of the first pushing pipe having one or more shaft pins, the second pushing pipe having one or more sliding grooves which receive the one or more shaft pin;

a compression spring provided in the second axial hole, one end of the compression spring butts against the second pushing pipe, and the other end butts against the first pushing pipe;

wherein as the first pushing pipe slides into the second axial hole, the compression spring is compressed and deformed by the first pushing pipe to generate an elastic force, the elastic force of the compression spring resets the first pushing pipe, as the external force on the first pushing pipe exceeds the retaining force of the compression spring, the first pushing pipe compresses the compression spring and retracts into the second axial hole;

wherein as the first pushing pipe of the pushing member moves along an axial direction of a coaxial cable, the first pushing pipe of the pushing member pushes a shielding layer of the coaxial cable to increase an angle of the shielding layer with respect to an inner insulating layer of the coaxial cable, the movement of the first pushing pipe of the pushing member relative to the second pushing pipe of the pushing member in the axial direction is limited by movement of the one or more shaft pins in the one or more sliding grooves.

14. The coaxial cable processing device according to claim 13, wherein the first pushing pipe is adapted to push pushes the shielding layer against an outer insulating layer of the coaxial cable to flare the shielding layer open forming an angle of 90 degrees with respect to the inner insulating layer;

wherein the second pushing pipe is adapted to be sheathed outside the outer insulating layer of the coaxial cable, so that the shielding layer is adapted to be flared by any angle between 90 degrees and 180 degrees from its initial position.

* * * * *